United States Patent [19]

Ohtorii

[11] Patent Number: 5,124,746
[45] Date of Patent: Jun. 23, 1992

[54] MECHANISM FOR WINDING AIR-TIGHT SHEET UP AND OFF

[75] Inventor: Masakazu Ohtorii, Hikone, Japan
[73] Assignee: Dainippon Screen Mfg. Co., Japan
[21] Appl. No.: 746,933
[22] Filed: Aug. 19, 1991

[30] Foreign Application Priority Data

Aug. 20, 1990 [JP] Japan .................. 2-219471

[51] Int. Cl.⁵ ............................................ G03B 27/20
[52] U.S. Cl. ............................................ 355/91; 355/94
[58] Field of Search ............... 355/87, 91, 94, 99

[56] References Cited

U.S. PATENT DOCUMENTS

| | | | |
|---|---|---|---|
| 4,029,404 | 6/1977 | Mizukami et al. | 355/91 |
| 4,437,759 | 3/1984 | Mizukami et al. | 355/91 |
| 4,636,064 | 1/1987 | Penza et al. | 355/91 X |
| 4,707,125 | 11/1987 | Ohlig et al. | 355/94 |
| 4,755,854 | 7/1988 | Theimer | 355/91 |
| 4,774,552 | 9/1988 | Nishihama et al. | 355/91 X |
| 4,962,405 | 10/1990 | Jones et al. | 355/94 X |
| 4,982,229 | 1/1991 | Inada et al. | 355/91 |
| 4,999,670 | 3/1991 | Wright | 355/91 |

FOREIGN PATENT DOCUMENTS

0241253 3/1990 Japan .

Primary Examiner—Richard A. Wintercorn
Attorney, Agent, or Firm—Ostrolenk, Faber, Gerb & Soffen

[57] ABSTRACT

Positional shifting of a photosensitive film due to poor winding-up and -off of an air-tight sheet is prevented without troublesome adjustments, whereby operationability of a contact printer is enhanced and improved. The air-tight sheet winding mechanism includes a connector frame fixed to a pair of carriages movable along each track rail disposed on both sides of a contact printer, and a roller holder for supporting a sheet roller. The connector frame is engaged with the roller holder by inserting micro bearings into oblong apertures. The roller holder and the sheet roller are engaged with the connector frame to slidably move in a direction B and swing about the micro bearing as shown by an arrow C. An air tight sheet is thus precisely and uniformly wound up and off according to its inherent properties including residual stress and residual strain.

16 Claims, 6 Drawing Sheets 5,124,746

MECHANISM FOR WINDING AIR-TIGHT SHEET UP AND OFF

BACKGROUND OF THE INVENTION

1. Field of the Invention

The present invention relates to a mechanism for winding up and off an air-tight sheet on a transparent top plate of a contact printer.

2. Description of the Prior Art

Air-tight sheet winding mechanisms are designed to wind up an air-tight sheet of a flexible material such as rubber, and alternatively wind off and spread out the sheet on a transparent top plate of a contact printer. On the transparent plate are mounted an original and a photosensitive film. Examples of such mechanisms are shown in JAPANESE PATENT PUBLICATION GAZETTE No. 63-18182 and No. 61-42249, which generally have a structure described below.

An air-tight sheet has one end fixed to the front of the body of a contact printer, and the other connected to a spring roller. The spring roller winds up the air-tight sheet by rotating about an axis due to the elasticity of an internal coil spring thereof. A pair of linear track rails are installed on respective sides of the printer body between the front and the rear ends of the contact printer. A carriage engaging with each track rail is driven to move along the track rail by a driving system including an endless chain and sprockets. A roller support for supporting the spring roller on both ends in a rotatable manner are secured in between the carriages. The roller support is laid parallel to and over the transparent top plate.

The roller support is first drawn by the carriages towards the rear end of the printer, or in a direction against the elasticity of the internal coil spring of the spring roller. Accordingly, the air-tight sheet wound around the roller is spread out under a certain tension over an original and a photosensitive film on the transparent top plate. When the roller support is moved towards the front end of the printer, the spring roller rotates due to the elasticity of the coil spring and thereby the air-tight sheet is wound around the spring roller.

In spreading the air-tight sheet, the original and the photosensitive film are tightly brought into contact with each other by removing the air in between the top plate and the air-tight sheet spreading over the original and the photosensitive film. The original and the photosensitive film are then irradiated with light from a light source, so that the photosensitive film is exposed to make a negative film.

The original and the photosensitive film are fixed on the top plate by common pin bars. When a plurality of negative films are printed from a single original, the plurality of negative films sometimes show positional mismatch of characters or figures between each other. Namely, the photosensitive films are not accurately positioned against the original on the top plate but are shifted by some amount.

Such positional shifting may primarily be attributed to a shift of the photosensitive film, which is directly in contact with the air-tight sheet, from the original when the air-tight sheet is laid over the original and the photosensitive film on the top plate. The positional shift of the photosensitive film is caused, for example, by crumples of the air-tight sheet spread over the photosensitive film or a misalignment of both sides of the air-tight sheet wound around the spring roller.

In the conventional air-tight sheet winding mechanisms described above, high accuracy parts including the air-tight sheet are required to prevent the positional shift of the photosensitive film.

The conventional mechanism has independent driving systems disposed on respective sides of the contact printer. Two ends of the roller support for supporting the spring roller are independently drawn by the respective driving systems, and thus the roller support may move obliquely or unevenly against the moving direction.

The air-tight sheet winding mechanism requires fine adjustments about the following items on assembly to ensure its high precision: straightness and parallelism of the track rails disposed on both ends of the contact printer, tension of the endless chain of each driving system, synchronous actuation of the driving systems, and tension of the air-tight sheet.

While metal parts such as sprockets attain the high precision rather easily, the rubber air-tight sheet is not readily manufactured with similar precision in shape, thickness, and width to the metal parts. Heterogeneous physical properties of the rubber air-tight sheet cause waviness, residual stress, residual strain, and other unevenness during manufacture of the sheet.

Even when metal parts are manufactured with high precision and various fine adjustments are implemented on assembly and installment of the printer, such heterogeneous physical properties of the sheet may cause non-straight or oblique movement or waviness of the sheet during repeated winding-up and -off of the air-tight sheet; this results in positional shifting of the photosensitive film. Positional shifting should accordingly be checked and adjusted after every predetermined number of winding-up and -off operations of the air-tight sheet.

Namely, in the conventional air-tight sheet winding mechanism, the troublesome fine adjustments are often required to prevent positional shifting during continual operation of the contact printer.

SUMMARY OF THE INVENTION

The object of the present invention is to relieve adjustment labor required for preventing positional shifting of a photosensitive film and to improve operability of a contact printer.

The present invention is directed to an apparatus for winding an air-tight sheet up and off on a plate, comprising:

a body frame;

a light transmission plate mounted on the body frame;

an air-tight sheet whose first sheet end is fixed to a first end of the body frame;

a sheet roller, connected to a second sheet end of the air-tight sheet, for winding the air-tight sheet;

holding means for holding the sheet roller rotatably about an axis of the sheet roller;

moving means for moving in a first direction substantially perpendicular to the axis between the first end and a second end of the body frame;

connection means for connecting the moving means and the holding means while allowing a movement of the holding means at least in one direction parallel to the light transmission plate; and mechanical energy accumulating means for accumulating mechanical energy during movement of the moving means towards the second end of the body frame, and rotating the sheet roller according to the mechanical energy to wind up the air-tight sheet during movement of the moving means towards the first end.

According to an aspect of the present invention, the connection means allows a swing of the holding means within a plane substantially parallel to the light transmission plate.

Preferably, the connection means comprises: a support pin, perpendicular to the light transmission plate, for rotatably supporting the holding means; and a connecting member for connecting the support pin to the moving means; and the holding means comprises: side plates for rotatably holding the sheet roller; and a roller, mounted on each of the side plates, for rotating in the first direction on a plane parallel to the light transmission plate.

According to another aspect of the present invention, the connection means allows a movement of the holding means in a second direction substantially perpendicular to the first direction and parallel to the light transmission plate.

Preferably, the connection means comprises: an aperture plate connected to the moving means and having two oblong apertures whose longer axes are arrayed along the second direction; and two through pins, connected to the holding means, passing through the respective two oblong apertures, and being movable in the oblong apertures along the longer axes.

Alternatively, the connection means comprises: an aperture plate, connected to the moving means and having two oblong apertures whose longer axes are arrayed along the second direction; and two bearings, connected to the holding means and having a rotatable outer rings, the rotatable outer ring contacting a side wall of each of the oblong apertures and moving along the longer axes.

According to still another aspect of the present invention, the connection means allows a swing of the holding means within a plane substantially parallel to the light transmission plate and a movement of the holding means in a second direction substantially perpendicular to the first direction and parallel to the light transmission plate.

Preferably, the connection means comprises: an aperture plate, connected to the moving means and having an oblong aperture formed at about the center of the aperture plate, the longer axis of the oblong aperture being along the second direction; and a bearing, connected to the holding means and having an outer ring in contact with a side wall of the oblong aperture, the bearing rotatably moving along the longer axis of the oblong aperture.

The holding means further comprises: two side plates for rotatably holding the sheet roller, each of the side plates having an oblong hole in the second direction; and the connection means further comprises: two swing control pins, each being inserted into the oblong hole, for regulating a range of the swing within the oblong hole.

The connection means in the above apparatus further comprises: a first upper plate and a first lower plate; and first sliding sheets fixed on respective inner faces of the first upper plate and the first lower plate; and the holding means comprises: a second upper plate and a second lower plate disposed on the upper and lower ends of the holding means, respectively; and second sliding sheets fixed on respective outer faces of the second upper plate and the second lower plate, the second sliding sheets facing the first sliding sheets, whereby the first and second sliding sheets smoothly slide along each other.

The apparatus is a contact printer for producing a reproduced image of an original on a photosensitive film where the original and the photosensitive film are mounted on the light transmission plate; and the apparatus further comprises:

a light source for emitting light towards the light transmission plate from an opposite side of the original and the photosensitive film; and a vacuum pump for evacuating a space between the airtight sheet and the light transmission plate.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
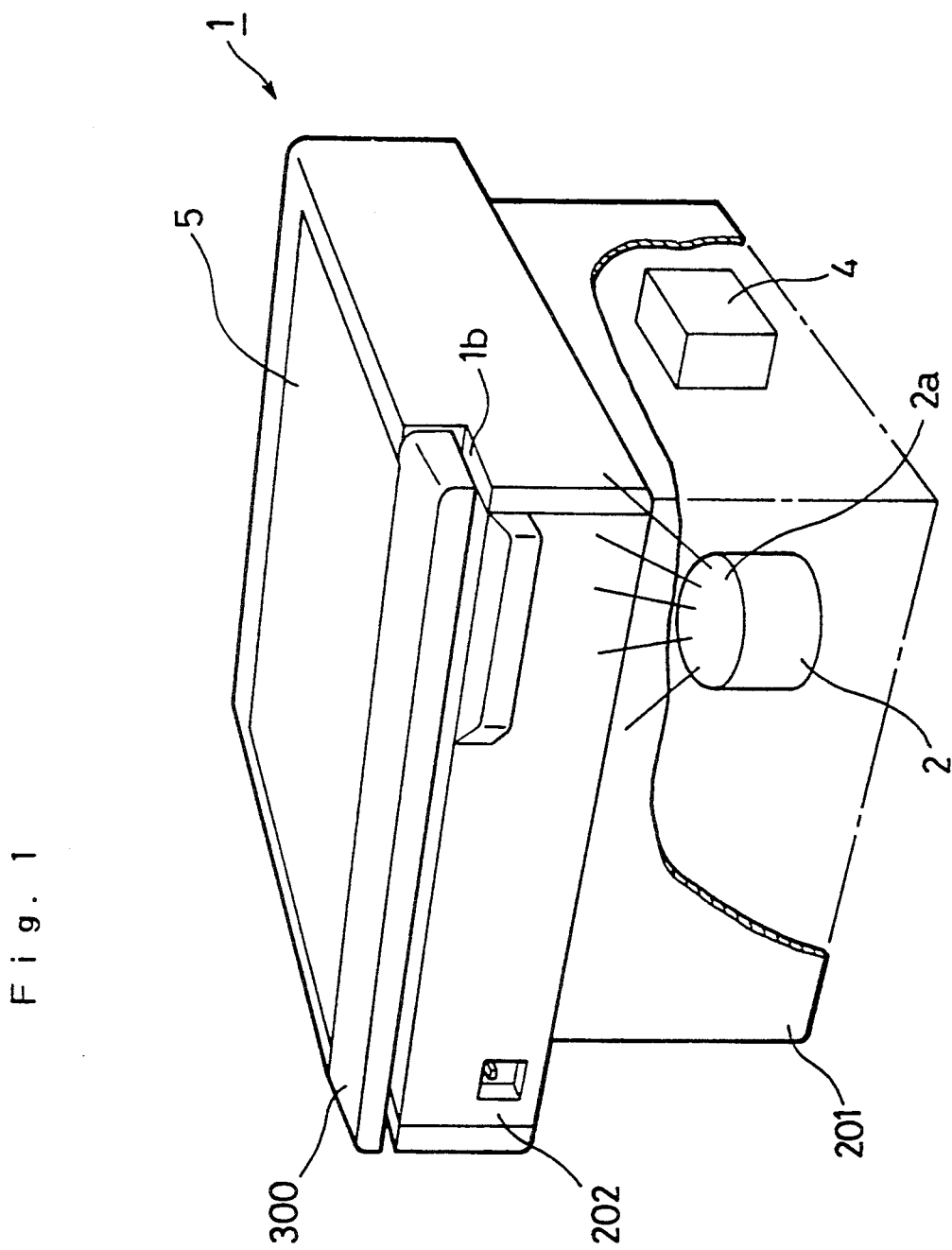
FIG. 1 is a schematic perspective view of a contact printer.

FIG. 1 is a schematic perspective view of a contact printer. An upper body 202 of the contact printer 1 is larger than a lower body 201. The upper body 202 has a lower step 1b at its front end where a roller system 300 is located. The roller system 300 includes a roller and an air-tight sheet wound around the roller. The upper body 202 is also provided with a transparent top glass plate 5 at its top surface, on which an original and a photosensitive film are mounted in this order.

The printer 1 comprises a light source 2 and a vacuum pump 4 within the body. The inlet nozzle of the vacuum pump 4 is connected to a piping system (not shown) which has holes on the upper surface of the upper body 202 at each side of the glass plate 5. The vacuum pump 4 vacuum (via holes, not shown) evacuates the air in between the glass plate 5 and the air-tight sheet which is spread over the plate to make the original and the film in tight contact with the glass plate 5. The light source 2 then emits light towards the glass plate 5 to expose the photosensitive film to produce a negative film. The light source 2 is provided with a lens 2a for refracting the light to uniformly irradiate the glass plate 5.

Figure 2:
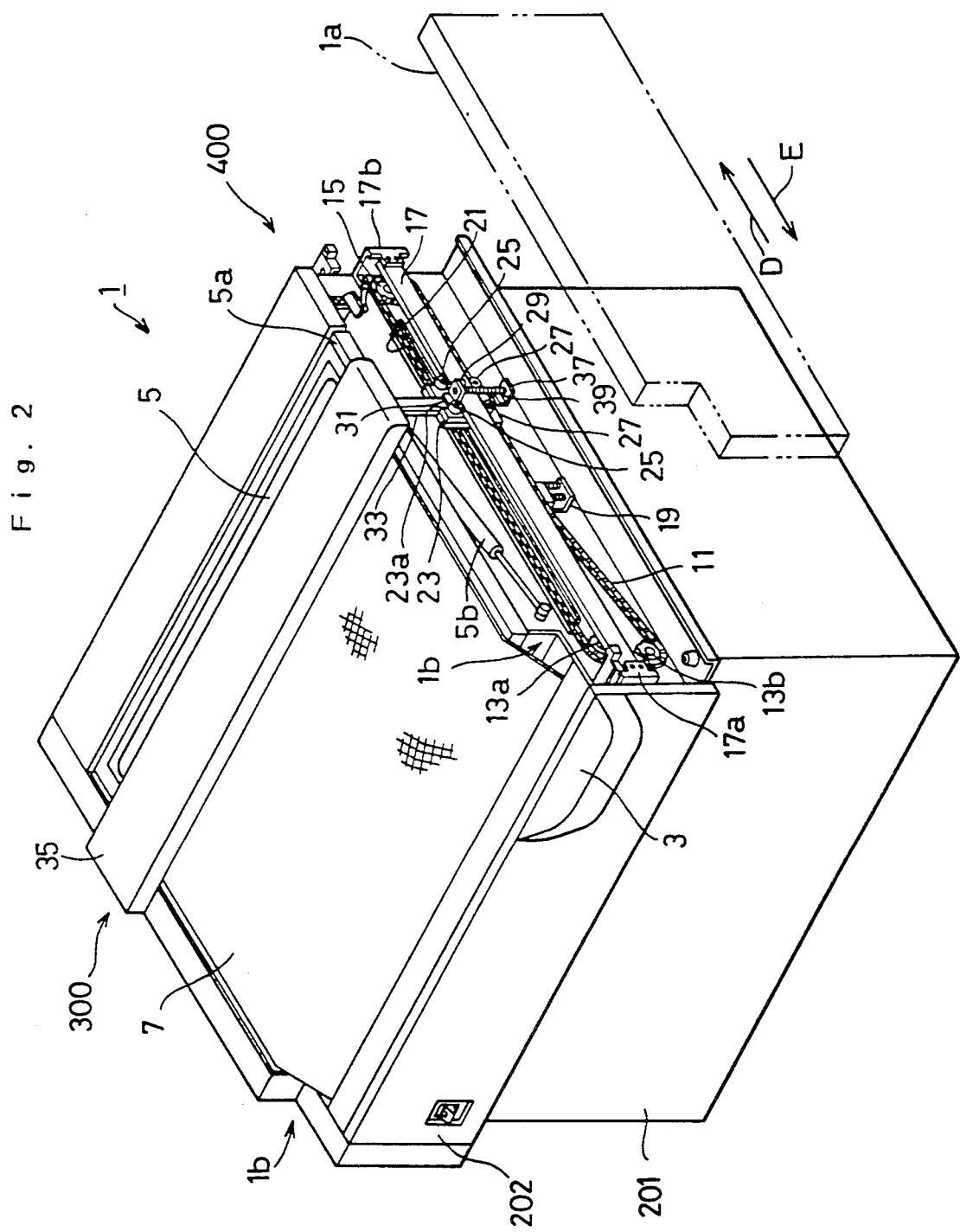
FIG. 2 is a schematic perspective view of the printer illustrating an air-tight sheet winding mechanism embodying the present invention.

FIG. 2 illustrates an air-tight sheet winding mechanism embodying the present invention. The mechanism winds a rubber air-tight sheet 7 up and off on the glass plate 5 by moving between a front end and a rear end of the contact printer 1. The front end is provided with a control panel 3 for inputting operational data. The glass plate 5 is openably attached to the upper body 202 via a frame 5a and a cylinder 5b. The glass plate 5 is made to pivot away from the upper body 202 when it is necessary to perform maintenance of the printer and and/or to clean the lower face of the glass plate 5.

The air-tight sheet winding mechanism includes the roller system 300 and a driving system 400. Both systems include respective units provided on opposite sides of the upper body 202.

Each unit of the driving system 400 includes an endless chain 11, driven sprockets 13a and 13b, a driving sprocket 15, and a track rail 17, and is covered with a side cover 1a.

The endless chain 11 is engaged with the sprockets 13a, 13b, and 15 under a specific tension adjusted by a tension controller 19. The endless chain 11 moves between the driven sprocket 13a and the driving sprocket 15 while sliding on the upper face of a chain guide plate 21 outwardly extending from the side face of the upper body 202. The driving sprocket 15 is disposed a little lower than the driven sprocket 13a and the chain guide plate 21 is fixed corresponding to the positions of the sprockets 13a and 15.

The track rail 17 is fixed outside the endless chain 11 and the sprockets 13a, 13b, and 15 to two brackets 17a and 17b projecting from the side face of the upper body. Both upper and lower faces of the track rail 17 are parallel to the glass plate 5, and both side faces thereof are perpendicular to the glass plate 5.

A rectangular carriage 23 is engaged with the track rail 17 in the following manner. The carriage 23 has two upper rollers 25 rotating in contact with the upper face of the track rail 17 and two lower rollers 27 rotating in contact with the lower face of the track rail 17. The rollers 25 and 27 are directly mounted on the front face of the carriage 23. The carriage 23 further has a side roller 29 rotating in contact with the outer side face of the track rail 17. The side roller 29 is mounted to the carriage 23 via an L-shaped bracket 31. The carriage 23 is engaged with the track rail 17 due to the hold of the rollers 25, 27, and 29, and moves along the track rail 17 while the rollers 25, 27, and 29 are rotating.

The carriage 23 has a groove 23a formed perpendicular to the track rail 17. A lifting arm 33 is slidably engaged with the groove 23a. The lifting arm 33 is connected to the endless chain 11 by a pin (not shown) on the rear face of the plate 33. The movement of the chain 11 is accordingly transmitted to the lifting arm 33 to thereby move the carriage 23.

To the upper end of the lifting arm 33 is fixed a connector frame 40 (described below with respect to FIGS. 3-7) of the roller system 300 stored in a cover 35. An L-shaped lower bracket 37 is fixed to the lower end of the lifting arm 33. A spring 39 is mounted in between the lower bracket 37 and the upper bracket 31 to lift the lower end of the lifting arm 33 towards the upper bracket 31.

When the driving sprocket 15 is rotated by a motor (not shown) to move the endless chain 11, the carriage 23 moves with the lifting arm 33 along the track rail 17 between the driven sprocket 13a and the driving sprocket 15, that is, between the front end and the rear end of the contact printer 1. The carriage 23 moves the roller system 300 connected with the lifting arm 33 between the front and rear ends of the contact printer 1.

The lifting arm 33 slidably descends in the groove 23a when the pin joint of the panel 13 with the endless chain 11 comes down to the driven sprocket 13b. The roller system 300 is accordingly moved down to the step 1b, formed lower than the upper face of the glass plate 5 on the front end of the upper body 202. On the contrary, the lifting arm 33 slidably ascends in the groove 23a when the pin joint goes up from the driven sprocket 13b to the driven sprocket 13a due to the reverse rotation of the motor driving the driving sprocket 15. The roller system 300 is accordingly lifted from the step 1b onto the glass plate 5.

The roller system 300 rests on the step 1b when the contact printer 1 is not operated and when an original and a photosensitive film are mounted on the glass plate 5.

Figure 3:
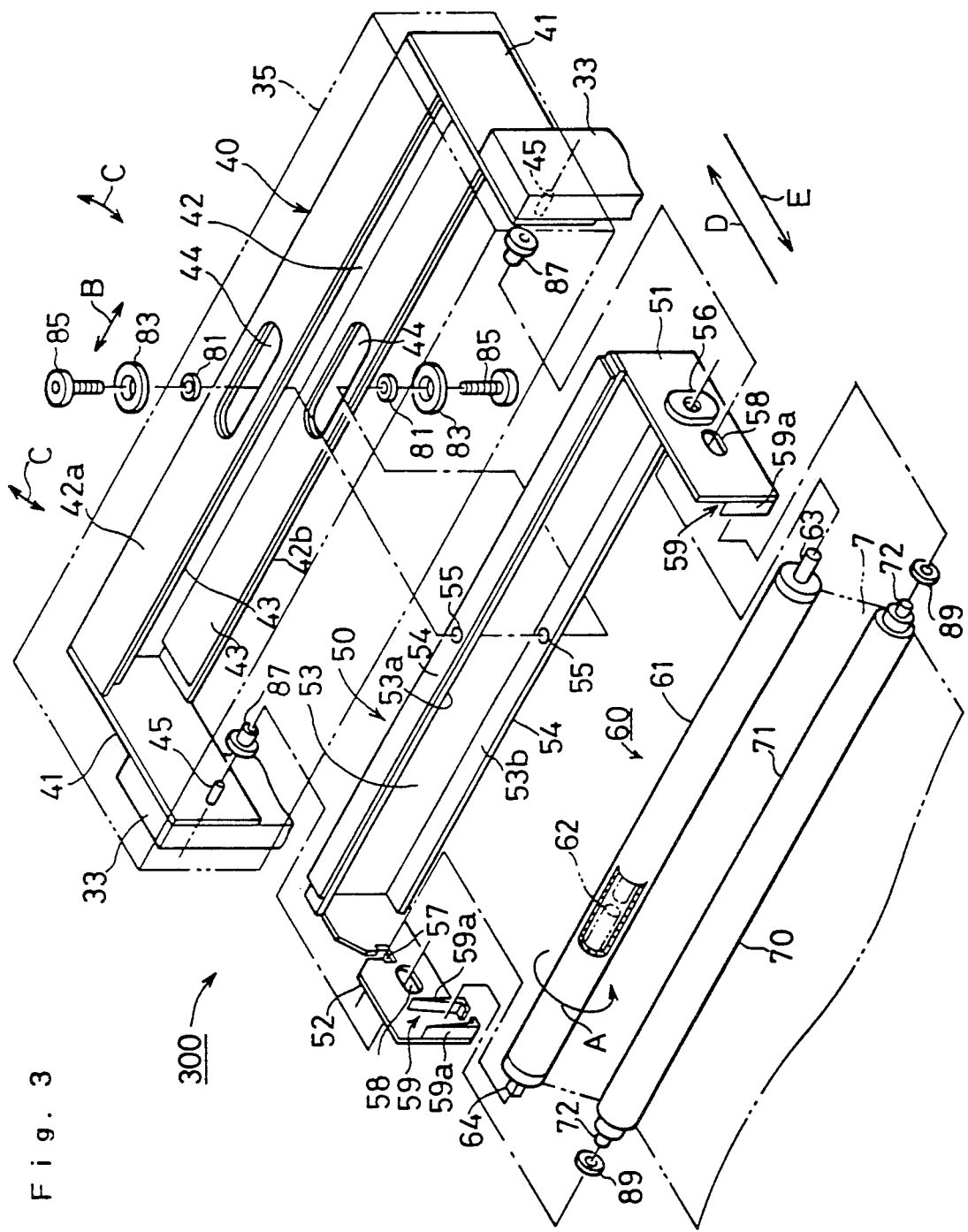
FIG. 3 is a decomposed perspective view illustrating a roller system of the air-tight sheet winding mechanism of FIG. 2.

FIG. 3 is an exploded perspective view illustrating the roller system 300. The roller system 300 comprises the cover 35, the connector frame 40 fixed on the upper ends of the lifting arms 33, a roller holder 50 incorporated into the connector frame 40, the sheet roller 60 for winding the air-tight sheet 7, and a squeegee roller 70 for pressing the air-tight sheet 7 onto the upper face of the glass plate 5. One end of the sheet 7 is fixed to the front end of the upper body 202 as shown in FIG. 2, and the other end is fixed to the sheet roller 60.

The connector frame 40 includes side panels 41 directly fixed to the respective lifting arms 33 and a U-shaped connector panel 42. The side panels 41 are respectively fixed to the ends of the connector panel 42. An inner slide sheet 43 of fluororesin with low frictional surface is adhesively fixed to the inner faces of an upper panel 42a and a lower panel 42b of the connector panel 42. An oblong aperture 44 is formed in the center of the upper panel 42a and the lower panel 42b. A support pin 45 is inwardly projected from each side panel 41.

The roller holder 50 has a right support panel 51 and a left support panel 52 for supporting the sheet roller 60 and the squeegee roller 70, and a U-shaped joint support panel 53. The panels 51 and 52 are respectively fixed to the ends of the joint support panel 53. An outer slide sheet 54 of fluororesin having a low frictional surface is adhesively fixed to the outer faces of an upper panel 53a and a lower panel 53b of the joint support panel 53. A tapped hole 55 is formed in the center of the upper panel 53a and the lower panel 53b. A bearing 56 is fixed to the right support panel 51, and a rectangular fixing hole 57 opposing the bearing 56 is formed on the left support panel 52. Each of the support panels 51 and 52 has an oblong aperture 58. A pair of facing L-shaped guide panels 59a are fixed on each of the inside surfaces of the support panels 51 and 52 to form a bearing guide groove 59.

The sheet roller 60 rotates about an axis shown by an arrow A in FIG. 3 by elasticity of a coil spring 62 stored in a cylindrical winding drum 61. An end of the coil spring 62 is fixed to a right bearing metal 63 of the winding drum 61 and the other to a left bearing metal 64. The right bearing metal 63 is supported by the bearing 56, and the left bearing metal 64 is fixedly inserted into the fixing hole 57. When the winding drum 61 is rotated in a direction opposite to the arrow A against the coil spring 62 and a force applied in the reverse direction is then released, the winding drum 61 rotates by a turning effect or elasticity in the direction A accumulated in the coil spring 62 so as to wind the air-tight sheet 7 thereon.

The squeegee roller 70 includes a columnar roller body 71 of rubber, and support shafts 72 projected from both ends of the roller body 71.

The roller holder 50 is engaged with the connector frame 40 in the following manner. The joint support panel 53 of the roller holder 50 is inserted in between the upper panel 42a and the lower panel 42b of the connector panel 42 of the connector frame 40. Each set of a micro bearing 83 and a collar 81 rotatably incorporated therein is positioned within the oblong aperture 44 and fixed to each of the upper panel 53a and the lower panel 53b of the joint support panel 53 with a bolt 85. The roller holder 50 and the sheet roller 60 supported thereon are thus engaged with the connector frame 40 to slidably move in a direction of an arrow B and swing about the micro bearing 83 as shown by an arrow C. The roller holder 50 is so engaged that the sheet roller 60 is parallel to the glass plate 5.

A collar 87 with a flange is mounted between each side panel 41 of the connector frame 40 and each of the right support panel 51 and the left support panel 52 of the roller holder 50 with the support pin 45 inwardly projecting from the side panel 41. The smaller cylindrical body of the collar 87 is inserted into the oblong aperture 58 on each of the right support panel 51 and the left support panel 52. The smaller bodies of the collars 87 accordingly support the right support panel 51 and the left support panel 52 of the roller holder 50 without interfering with the slidable movement and the swing of the roller holder 50. The amount of a swing of the roller holder 50 and the sheet roller 60 is controlled by the oblong aperture 58 engaging the smaller body of the collar 87.

The sheet roller 60 is incorporated in the roller holder 50 by connecting the right bearing metal 63 to the bearing 56 on the right support panel 51 and by inserting the left bearing metal 64 in the fixing hole 57 on the left support panel 52.

The support shaft 72 provided on each side of the squeegee roller 70 is inserted into a ball bearing 89, which is put into each of the bearing guide grooves 59 at the right support panel 51 and the left support panel 52. The squeegee roller 70 is thus rotatably supported by the roller holder 50. The squeegee roller 70 presses the air-tight sheet 7 against the upper face of the glass plate 5 with its dead weight while the sheet 7 is drawn from the sheet roller 60.

The air-tight winding mechanism described above is operated as follows.

When the control panel 3 instructs winding-off of the air-tight sheet 7, the driving sprockets 15 on both sides of the contact printer 1 are rotated by the motor (not shown) so as to run the endless chains 11 in a direction of an arrow D in FIGS. 2 and 3 (that is, clockwise at the right hand side of the printer). The pin joint of each lifting arm 33 is accordingly lifted from the driven sprocket 13b to the driven sprocket 13a, thus allowing the lifting arm 33 to ascend. The side panels 41 of the connector frame 40 ascend with the lifting arms 33, and the roller system 300 resting on the step 1b on the front end of the contact printer 1 is lifted up. The carriages 23 move with the lifting arms 33 from the front end to the rear end of the contact printer 1 along the track rails 17 to thereby move the roller system 300 while maintaining the system 300 parallel to the glass plate 5.

The sheet roller 60 is rotated against elasticity of the coil spring 62, that is, in a direction opposite arrow A, and moved towards the rear end of the contact printer 1. The air-tight sheet 7 is thus wound off from the sheet roller 60 and spread over an original and a photosensitive film on the glass plate 5 under a specific tension.

In spreading the sheet, the roller holder 50 slidably moves in the direction B and swings as shown by the arrow C against the connector frame 40, which moves along with the lifting arm 33. The free slidable movement and the swing ensure freedom in transmission of a force from the connector frame 40 to the sheet roller 60. The air-tight sheet 7 is accordingly wound off from the sheet roller 60 under a uniform tension. Even when the connector frame 40 runs unevenly or obliquely out of the straight direction D, the sheet roller 60 is not affected by such abnormal movements. The air-tight sheet 7 is therefore precisely and uniformly laid over the glass plate 5 according to its inherent properties including residual stress and residual strain.

The air-tight sheet winding mechanism described above will effectively prevent poor winding-off of the air-tight sheet 7 due to oblique or uneven movement of the connector frame 40, and eliminate the need for troublesome adjustments, such as those concerning straightness and parallelism of the track rails 17, tension of the endless chain 11 of each driving system, and synchronous actuation of the driving systems. The winding mechanism will lay the air-tight sheet 7 irrespective of its unevenness and will not cause any positional shifting of a photosensitive film directly in contact with the air-tight sheet 7. The operability of the contact printer 1 will be thus greatly enhanced and improved.

When the control panel 3 instructs winding-up of the air-tight sheet 7, the driving sprockets 15 on both sides of the contact printer 1 are reversely rotated by the motor (not shown) so as to run the endless chains 11 in a direction E of FIG. 2 and FIG. 3 (counterclockwise at the right hand side of the printer). The carriages 23 positioned on the rear end of the contact printer 1 are first moved with the lifting arms 33 towards the front end along the track rails 17 so as to move the roller system 300 while maintaining the system parallel to the glass plate 5. The pin joint of each lifting arm 33 is then lowered from the driven sprocket 13a to the driven sprocket 13b, thus allowing the lifting arm 33 to descend. The roller system 300 is accordingly moved down onto the step 1b.

While the sheet roller 60 is moved towards the front end of the contact printer 1, the sheet roller 60 is rotated by a turning effect or elasticity of the coil spring 62 in the direction A. The air-tight sheet 7 laid over an original and a photosensitive film on the glass plate 5 is thus wound around the sheet roller 60.

In winding-up of the air-tight sheet 7, the roller holder 50 slidably moves in the direction B and swings as shown by the arrow C of FIG. 3 against the connector frame 40. The free slidable movement and the swing ensure freedom in transmission of a force from the connector frame 40 to the sheet roller 60. The air-tight sheet 7 is accordingly wound around the sheet roller 60 under a uniform tension. Even when the connector frame 40 runs unevenly or obliquely out of the straight direction D, the sheet roller 60 is not affected by such abnormal movements. The air-tight sheet 7 is therefore precisely and uniformly wound around the sheet roller 60 according to its inherent properties including residual stress and residual strain.

The air-tight sheet winding mechanism described above will effectively prevent poor winding-up of the air-tight sheet 7 due to oblique or uneven movement of the connector frame 40 in the direction E, and eliminate the need for troublesome adjustments. The precise winding-up of the air-tight sheet 7 will effectively prevent positional shifting of a photosensitive film. The operability of the contact printer 1 will be thus greatly enhanced and improved.

In the air-tight sheet winding mechanism, the inner slide sheets 43 of fluororesin, which has a low friction surface, are adhered to the inner faces of the upper panel 42a and the lower panel 42b of the connector panel 42. The outer slide sheets 54 with the low friction surface are also adhered to the outer faces of the upper panel 53a and the lower panel 53b of the joint support panel 53. These slide sheets enable the roller holder 50 to smoothly slide and move against the connector frame 40.

Although the sheet roller 60 supported by the roller holder 50 is slidably and rotatably engaged with the connector frame 40 in the above embodiment, another sheet winding system may be employed having another structure to support the sheet roller 60.

Figure 4:
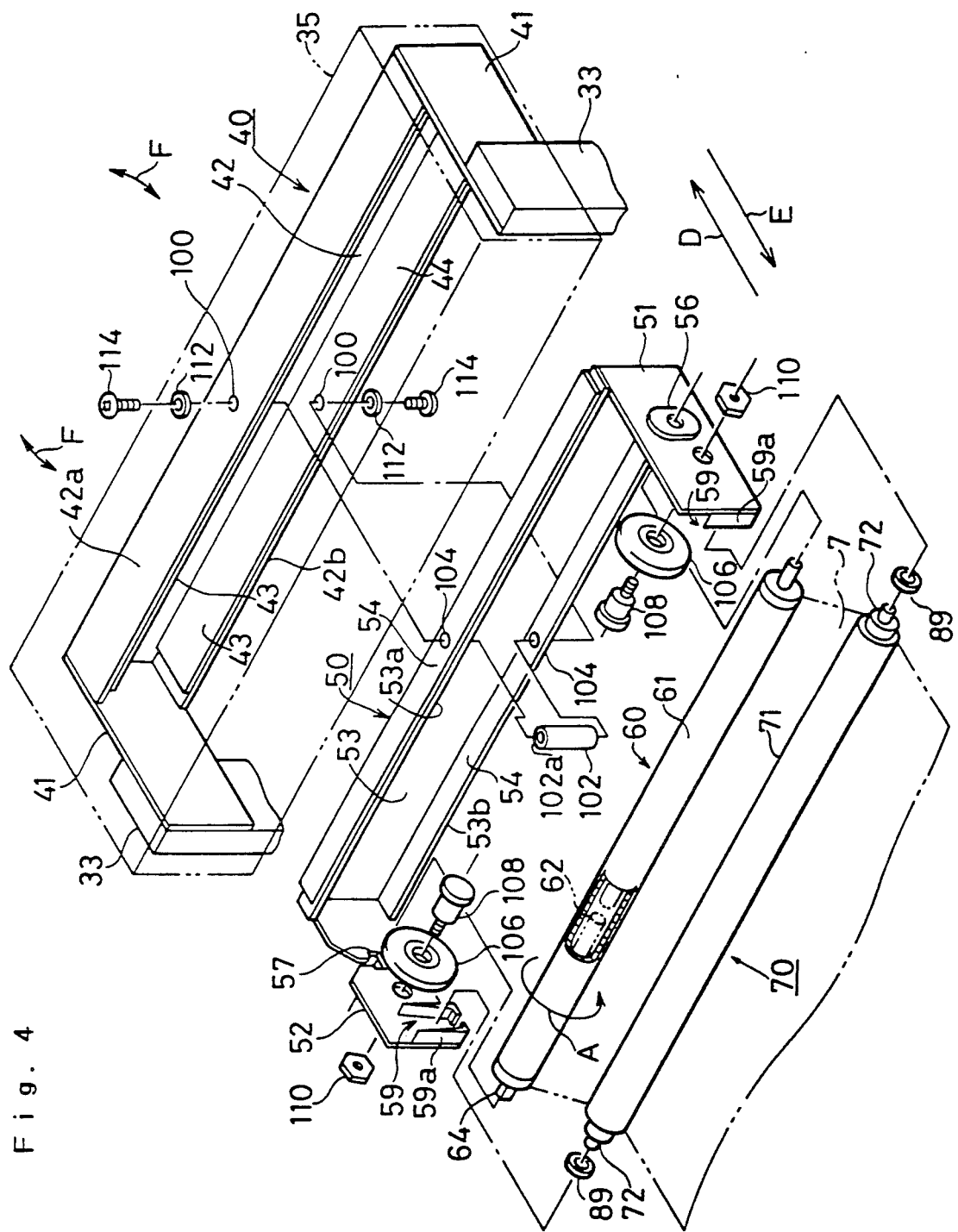
FIG. 4 is a decomposed perspective view illustrating a roller system of an air-tight sheet winding mechanism of a second embodiment.

FIG. 4 illustrates a roller system as a second embodiment of the present invention. In FIG. 4, a fit aperture 100, in place of the oblong aperture 44 of FIG. 3, is formed on the center of the upper panel 42a and the lower panel 42b of the connector frame 40. The tapped holes 55 of the roller holder 50 and replaced with non-tapped holes 104 engaging a pin 102.

Figure 5:
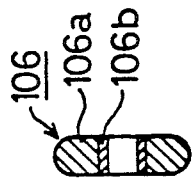
FIG. 5 is a cross sectional view illustrating a rotational support roller 106 of the system of FIG. 4.

In the first embodiment of FIG. 3, the end support mechanism, which supports the end plates 51 and 52 of the roller holder 50, includes the support pins 45 each projecting from the inner face of the side panel 41, the oblong apertures 58 formed on the roller holder 50, and the collars 87. In the second embodiment of FIG. 4, the end support mechanism includes toroidal support rollers 106 fixed to the opposite faces of the support panels 51 and 52 with respective support pins 108 and nuts 110; the support rollers 106 thus support the support panels 51 and 52. As shown in FIG. 5, the support roller 106 has a roller bearing 106b inserted in a rubber outer ring 106a. Roller running surface for the outer ring 106a are placed along the exposure glass plate 5 on both sides of the upper face of the contact printer 1.

The roller holder 50 of FIG. 4 is engaged with the connector frame 40 in the following manner. The engagement pin 102 is inserted into the fit hole 104 on the upper and the lower panels 53a and 53b. A pair of screws 114 are inwardly inserted into tapped holes 102a formed on the ends of the engagement pin 102 via flat washers 112 and the upper panel 42a or the lower panel 42b. The roller holder 50 and the sheet roller 60 supported thereon are engaged with the connector frame 40 to swing about the engagement pin 102 as shown by an arrow F. The support rollers 106 are in point contact with the roller running surface of the glass plate 5, and thus do not interfere with the swing of the roller holder 50 and the sheet roller 60.

In the air-tight sheet winding mechanism of the second embodiment thus constructed, the roller holder 50 freely swings as shown by the arrow F of FIG. 4 during winding-up and -off of the air-tight sheet 7. The free swing ensures freedom in transmission of a force from the connector frame 40 to the sheet roller 60. The air-tight sheet 7 is accordingly wound up and off under a uniform tension. The air-tight sheet 7 is therefore precisely and uniformly wound up and off according to its inherent properties including residual stress and residual strain.

The air-tight sheet winding mechanism of the second embodiment, like the first embodiment, will effectively prevent poor winding-up and -off of the air-tight sheet 7 while eliminating troublesome adjustment. The mechanism will not cause any positional shifting of a photosensitive film directly in contact with the air-tight sheet 7. The operability of the contact printer 1 will be thus greatly enhanced and improved.

Another means for supporting the roller holder 50 without interfering with the swing of the roller holder 50 about the engagement pin 102 is, for example, a caster employed instead of the support roller 106.

Figure 6:
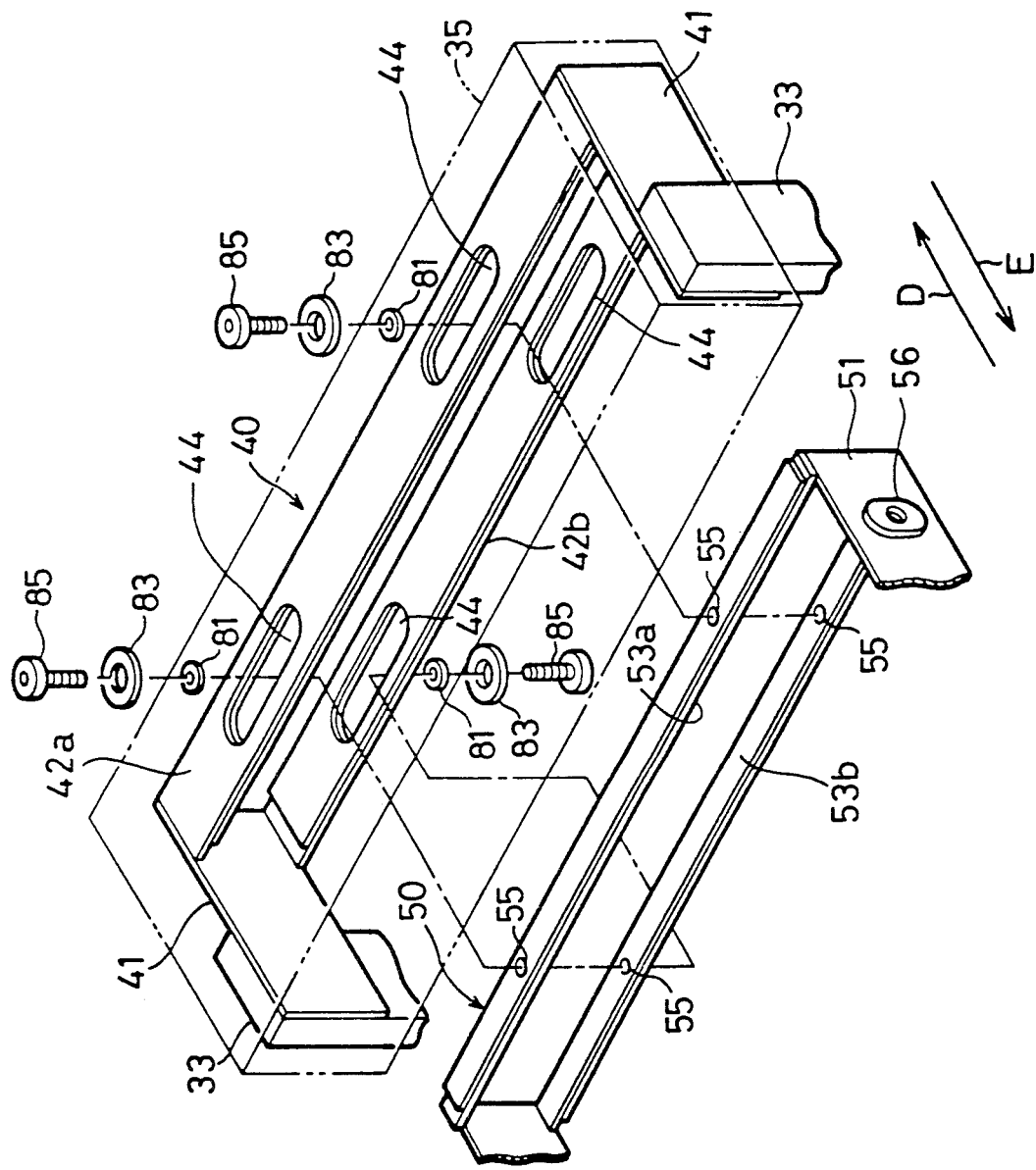
FIG. 6 is a decomposed perspective view illustrating a roller system of an air-tight sheet winding mechanism of a third embodiment.

FIG. 6 shows a roller system of a third embodiment of the present invention. Two oblong apertures 44 longitudinally aligned are formed on both ends of the upper panel 42a and the lower panel 42b of the connector frame 40. Two sets of the micro bearing 83 and the collar 81 rotatably incorporated therein are upwardly and downwardly inserted in the oblong aperture 44 and fixed to the upper and the lower panels 53a and 53b with the bolts 85, respectively. The roller holder 50 and the sheet roller 60 are engaged with the connector frame 40 to slidably move in a direction substantially perpendicular to the moving direction of the connector frame 40. The free slidable movement ensures freedom in transmission of a force from the connector frame 40 to the sheet roller 60. The air-tight sheet 7 is accordingly wound up and off under a uniform tension. The air-tight sheet 7 is therefore precisely and uniformly wound up and off according to its inherent properties including residual stress and residual strain.

The air-tight sheet winding mechanism of the third embodiment will effectively prevent poor winding-up and -off of the air-tight sheet 7 while eliminating troublesome adjustment. The winding mechanism of the third embodiment will not cause any positional shifting of a photosensitive film directly in contact with the air-tight sheet 7. The operability of the contact printer 1 will be thus greatly enhanced and improved.

Figure 7:
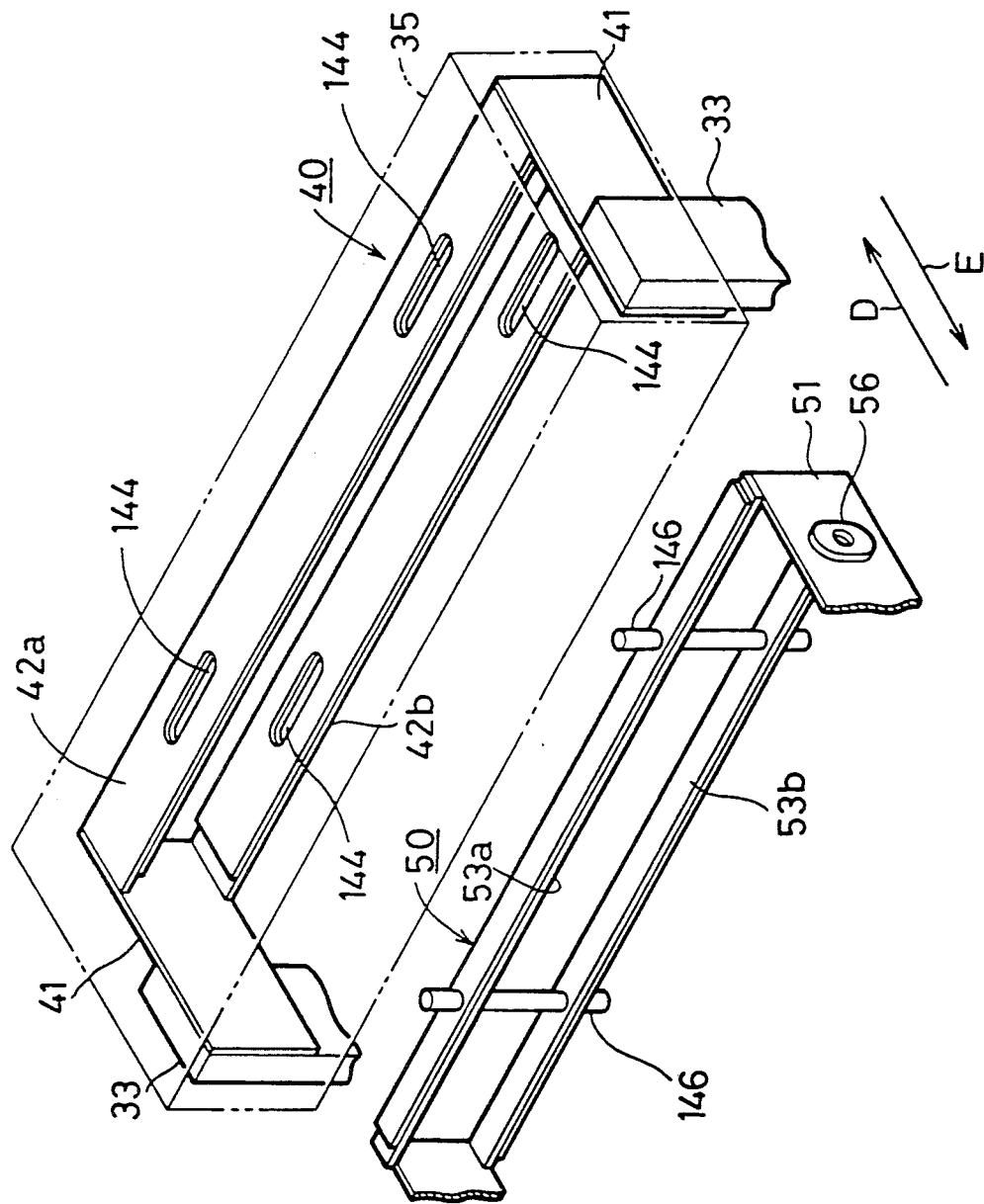
FIG. 7 is a decomposed perspective view illustrating a sheet winding system of an air-tight sheet winding mechanism of a forth embodiment.

FIG. 7 shows a roller system of a forth embodiment of the present invention. Two oblong apertures 144 longitudinally aligned are formed on both ends of the upper and the lower panels 42a and 42b of the connector frame 40. A pair of through pins 146 longitudinally movable in the respective oblong apertures 144 are mounted between the upper and the lower panels 53a and 53b of the roller holder 50. The roller holder 50 and the sheet roller 60 are engaged with the connector frame 40 to slidably move in a direction substantially perpendicular to the moving direction of the connector frame 40.

As described above, the air-tight sheet winding mechanism of the present invention includes a sheet roller, a moving unit for moving the sheet roller, and a holding unit driven by the moving unit for rotatably supporting the sheet roller. The mechanism allows the sheet roller either of the swing movement on a glass plate, and the shifting movement in a direction substantially perpendicular to the moving direction of the moving unit during winding-up and -off of an air-tight sheet. The air-tight sheet is thus wound up and off under a uniform tension according to its inherent properties.

The mechanism of the present invention will effectively prevent poor winding-up and -off of the air-tight sheet while eliminating troublesome adjustments for preventing uneven or oblique movement of the moving unit. Furthermore, the mechanism attains precise and uniform winding-up and -off of the air-tight sheet irrespective of its irregular movement on the glass plate. The winding mechanism of the invention will not cause any positional shifting of a photosensitive film and greatly enhances and improves the operability of a contact printer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for winding an air-tight sheet up and off on a plate, comprising:
   a body frame;
   a light transmission plate mounted on said body frame;
   an air-tight sheet having a first sheet end which is fixed to a first end of said body frame;
   a sheet roller connected to a second sheet end of said air-tight sheet, about which said air-tight sheet may be wound;
   holding means for securing said sheet roller for rotation about a longitudinal axis of said sheet roller;
   moving means for moving itself in a first direction substantially perpendicular to said longitudinal axis between said first end and a second end of said body frame;
   connection means for connecting said moving means and said holding means to each other, said connection means allowing movement of said holding means in at least a direction parallel to said light transmission plate; and
   mechanical energy accumulating means for accumulating mechanical energy during movement of said moving means towards said second end of the body frame;
   said mechanical energy accumulating means rotating said sheet roller with said accumulated mechanical energy during movement of said moving means towards said first end to wind up said air-tight sheet around said sheet roller.

2. An apparatus in accordance with claim 1, wherein said connection means allows rotation of said holding means about a vertical axis within a plane substantially parallel to said light transmission plate.

3. An apparatus in accordance with claim 2, wherein:
   A) said connection means comprises:
      1) a support pin disposed parallel to said longitudinal axis for rotatably supporting said holding means; and
      2) a connecting member for connecting said support pin to said moving means; and
   B) said holding means comprises:
      1) side plates for rotatably securing said sheet roller; and
      2) a roller mounted on each of said side plates, said roller rotating in said first direction about a vertical axis on a plane parallel to said light transmission plate.

4. An apparatus in accordance with claim 3, wherein:
   said connection means further comprises a first upper plate and a first lower plate connected to said moving means, each of said first plates having first sliding sheets fixed on their respective inner faces; and
   said holding means comprises a second upper plate and a second lower plate disposed on the upper and lower ends of said holding means, respectively, each of said second plates having second sliding sheets fixed on their respective outer faces, said second sliding sheets facing said first sliding sheets, whereby said first and second sliding sheets are in sliding contact with each other.

5. An apparatus in accordance with claim 2, wherein the apparatus is a contact printer for producing a reproduced image of an original on a photosensitive film where the original and the photosensitive film are mounted on said light transmission plate; and
   the apparatus further comprising:
   a light source for emitting light towards said light transmission plate from an opposite side of the original and the photosensitive film; and
   a vacuum pump for evacuating air from a space between said air-tight sheet and said light transmission plate.

6. An apparatus in accordance with claim 1, wherein said connection means allows a movement of said holding means in a second direction substantially perpendicular to said first direction and parallel to said light transmission plate.

7. An apparatus in accordance with claim 6, wherein said connection means comprises:
   an aperture plate connected to said moving means and having two oblong apertures whose longer axes are arrayed along said second direction; and
   two through pins connected to said holding means, said two through pins passing through said respective two oblong apertures and being movable in said oblong apertures along said longer axes.

8. An apparatus in accordance with claim 7, wherein:
   said connection means further comprises a first upper plate and a first lower plate, each of said first plates having first sliding sheets fixed on their respective inner faces; and
   said holding means comprises a second upper plate and a second lower plate disposed on the upper and lower ends of said holding means, respectively, each of said second plates having second sliding sheets fixed on their respective outer faces, said second sliding sheets facing said first sliding sheets, whereby said first and second sliding sheets are in sliding contact with each other.

9. An apparatus in accordance with claim 6, wherein said connection means comprises:
   an aperture plate connected to said moving means and having two oblong apertures whose longer axes are arrayed along said second direction; and
   two bearings connected to said holding means and having a rotatable outer ring, said rotatable outer ring contacting a side wall of each of said oblong apertures and moving along said longer axes.

10. An apparatus in accordance with claim 9, wherein:
    said connection means further comprises a first upper plate and a first lower plate, each of said first plates having first sliding sheets fixed on their respective inner faces; and
    said holding means comprises a second upper plate and a second lower plate disposed on the upper and lower ends of said holding means, respectively, each of said second plates having second sliding sheets fixed on their respective outer faces, said second sliding sheets facing said first sliding sheets, whereby said first and second sliding sheets smoothly slide along each other are in sliding contact with each other.

11. An apparatus in accordance with claim 6, wherein the apparatus is a contact printer for producing a reproduced image of an original on a photosensitive film where the original and the photosensitive film are mounted on said light transmission plate; and the apparatus further comprising:

a light source for emitting light towards said light transmission plate from an opposite side of the original and the photosensitive film; and a vacuum pump for evacuating air from a space between said air-tight sheet and said light transmission plate.

12. An apparatus in accordance with claim 1, wherein said connection means allows rotation of said holding means about a vertical axis within a plane substantially parallel to said light transmission plate and a movement of said holding means in a second direction substantially perpendicular to said first direction and parallel to said light transmission plate.

13. An apparatus in accordance with claim 12, wherein said connection means comprises:

an aperture plate connected to said moving means and having an oblong aperture formed at about the center of said aperture plate, the longer axis of said oblong aperture being arrayed along said second direction; and a bearing connected to said holding means and having an outer ring in contact with a side wall of said oblong aperture, said bearing rotatably moving along the longer axis of said oblong aperture.

14. An apparatus in accordance with claim 13, wherein:

said connection means further comprises a first upper plate and a first lower plate, each of said first plates having first sliding sheets fixed on their respective inner faces; and said holding means comprises a second upper plate and a second lower plate disposed on the upper and lower ends of said holding means, respectively, each of said second plates having second sliding sheets fixed on their respective outer faces, said second sliding sheets facing said first sliding sheets, whereby said first and second sliding sheets are in sliding contact with each other.

15. An apparatus in accordance with claim 12, wherein:

said holding means further comprises two side plates for rotatably securing said sheet roller, each of said side plates having an oblong hole; and said connection means further comprises two swing control pins, each of said control pins being inserted into said oblong hole for regulating a range of said rotation within said oblong hole.

16. An apparatus in accordance with claim 12, wherein the apparatus is a contact printer for producing a reproduced image of an original on a photosensitive film where the original and the photosensitive film are mounted on said light transmission plate; and the apparatus further comprising:

a light source for emitting light towards said light transmission plate from an opposite side of the original and the photosensitive film; and a vacuum pump for evacuating air from a space between said air-tight sheet and said light transmission plate.

* * * * *